(12) United States Patent
Spiegelberg et al.

(10) Patent No.: US 7,905,384 B1
(45) Date of Patent: Mar. 15, 2011

(54) COLD FORMED BATTERY TERMINAL

(75) Inventors: Bernard N. Spiegelberg, Mequon, WI (US); Terry J. Evraets, West Bend, WI (US)

(73) Assignee: Tulip Corporation, Milwaukee, WI (US)

( * ) Notice: Subject to any disclaimer, the term of this patent is extended or adjusted under 35 U.S.C. 154(b) by 0 days.

(21) Appl. No.: 12/642,485

(22) Filed: Dec. 18, 2009

Related U.S. Application Data

(63) Continuation-in-part of application No. 11/268,497, filed on Nov. 8, 2005, now Pat. No. 7,641,100, which is a continuation of application No. 10/162,059, filed on Jun. 4, 2002, now Pat. No. 7,163,763.

(51) Int. Cl.
*B23K 20/00* (2006.01)
*B21B 15/00* (2006.01)
*H01R 43/04* (2006.01)

(52) U.S. Cl. ............ 228/115; 29/874; 29/882; 429/178; 429/181; 429/182

(58) Field of Classification Search .................. None
See application file for complete search history.

(56) References Cited

U.S. PATENT DOCUMENTS

| | | | |
|---|---|---|---|
| 4,168,618 A | 9/1979 | Saier et al. | |
| 4,426,870 A | 1/1984 | Toropov et al. | |
| 4,491,002 A | 1/1985 | Toropov et al. | |
| 4,942,752 A | 7/1990 | Helfman | |
| 5,364,714 A | 11/1994 | Gürtler | |
| 5,373,720 A | 12/1994 | Ratte et al. | |
| 5,499,449 A * | 3/1996 | Carter et al. | 29/882 |
| 5,606,887 A | 3/1997 | Spiegelberg et al. | |
| 5,632,173 A | 5/1997 | Spiegelberg et al. | |
| 5,655,400 A | 8/1997 | Spiegelberg et al. | |
| 5,791,183 A | 8/1998 | Spiegelberg et al. | |
| 6,195,860 B1 | 3/2001 | Di Rosa et al. | |
| 6,216,510 B1 | 4/2001 | Hashimoto | |
| 6,223,576 B1 | 5/2001 | Mashita | |
| 6,298,703 B1 | 10/2001 | Focken et al. | |
| 6,644,084 B1 | 11/2003 | Spiegelberg | |
| 6,902,095 B2 * | 6/2005 | Ratte et al. | 228/115 |
| 7,021,101 B2 | 4/2006 | Spiegelberg | |
| 7,163,763 B2 * | 1/2007 | Spiegelberg et al. | 429/178 |
| 7,338,539 B2 | 3/2008 | Ratte et al. | |
| 7,628,049 B2 | 12/2009 | Spiegelberg et al. | |

(Continued)

FOREIGN PATENT DOCUMENTS

| | | |
|---|---|---|
| DE | 42 41 393 C1 | 7/1994 |
| EP | 0 601 268 B1 | 6/1994 |

OTHER PUBLICATIONS

U.S. Appl. No. 12/611,000, filed Nov. 2, 2009, Spiegelberg et al.

(Continued)

*Primary Examiner* — Kiley Stoner
(74) *Attorney, Agent, or Firm* — Foley & Lardner LLP

(57) ABSTRACT

A method and apparatus for cold forming a battery terminal having a battery coupling portion and an electrical coupling portion are provided. The battery coupling portion defines a first longitudinal axis and the electrical coupling portion defines a second longitudinal axis, the first axis being spaced from a distance from the second axis. The battery coupling portion and the electrical coupling portion may include one or more extensions. The electrical coupling portion may further include an insert.

23 Claims, 13 Drawing Sheets

U.S. PATENT DOCUMENTS

| | | | | |
|---|---|---|---|---|
| 7,641,100 B2 * | 1/2010 | Spiegelberg et al. | .......... | 228/115 |
| 2003/0224248 A1 * | 12/2003 | Spiegelberg et al. | .......... | 429/178 |
| 2005/0000090 A1 * | 1/2005 | Ratte et al. | .............. | 29/882 |
| 2005/0153202 A1 * | 7/2005 | Ratte et al. | .............. | 429/178 |
| 2006/0046140 A1 * | 3/2006 | Spiegelberg et al. | .......... | 429/178 |
| 2006/0068279 A1 * | 3/2006 | Spiegelberg et al. | .......... | 429/178 |
| 2006/0162417 A1 * | 7/2006 | Spiegelberg et al. | ........... | 72/402 |
| 2008/0038633 A1 * | 2/2008 | Ratte et al. | .............. | 429/178 |

OTHER PUBLICATIONS

Advertisement from Dionys Hofmann GmbH, "Battery Terminals—The Source of Power", undated (1 pg.) (undated).

Advertisement from Dionys Hofmann GmbH, "High Quality Battery Terminals", undated (1 pg.).

Fette Tool Systems, Inc., "Thread Rolling Systems", promotional materials printed in Germany, undated (10 pgs.).

* cited by examiner

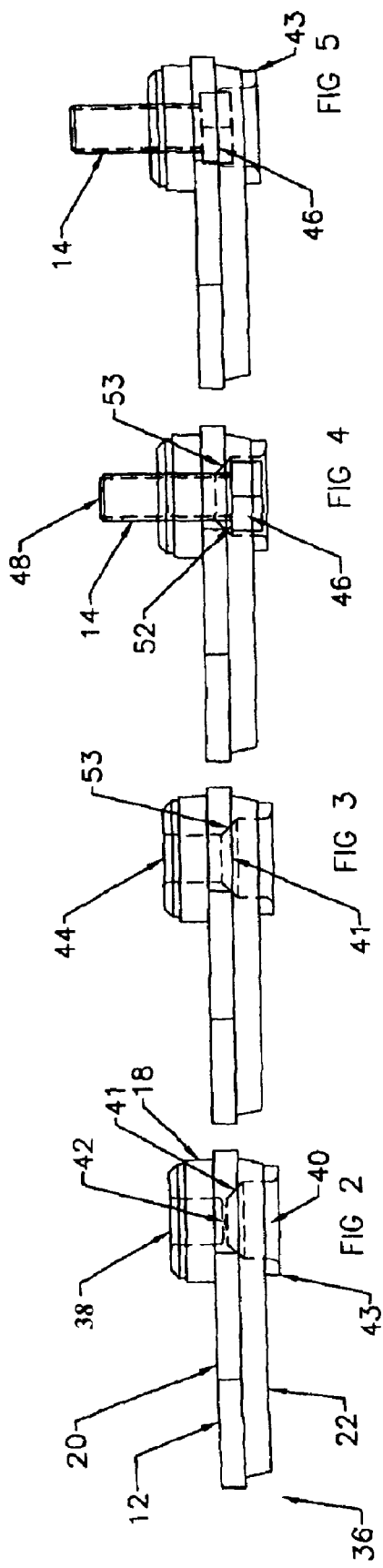

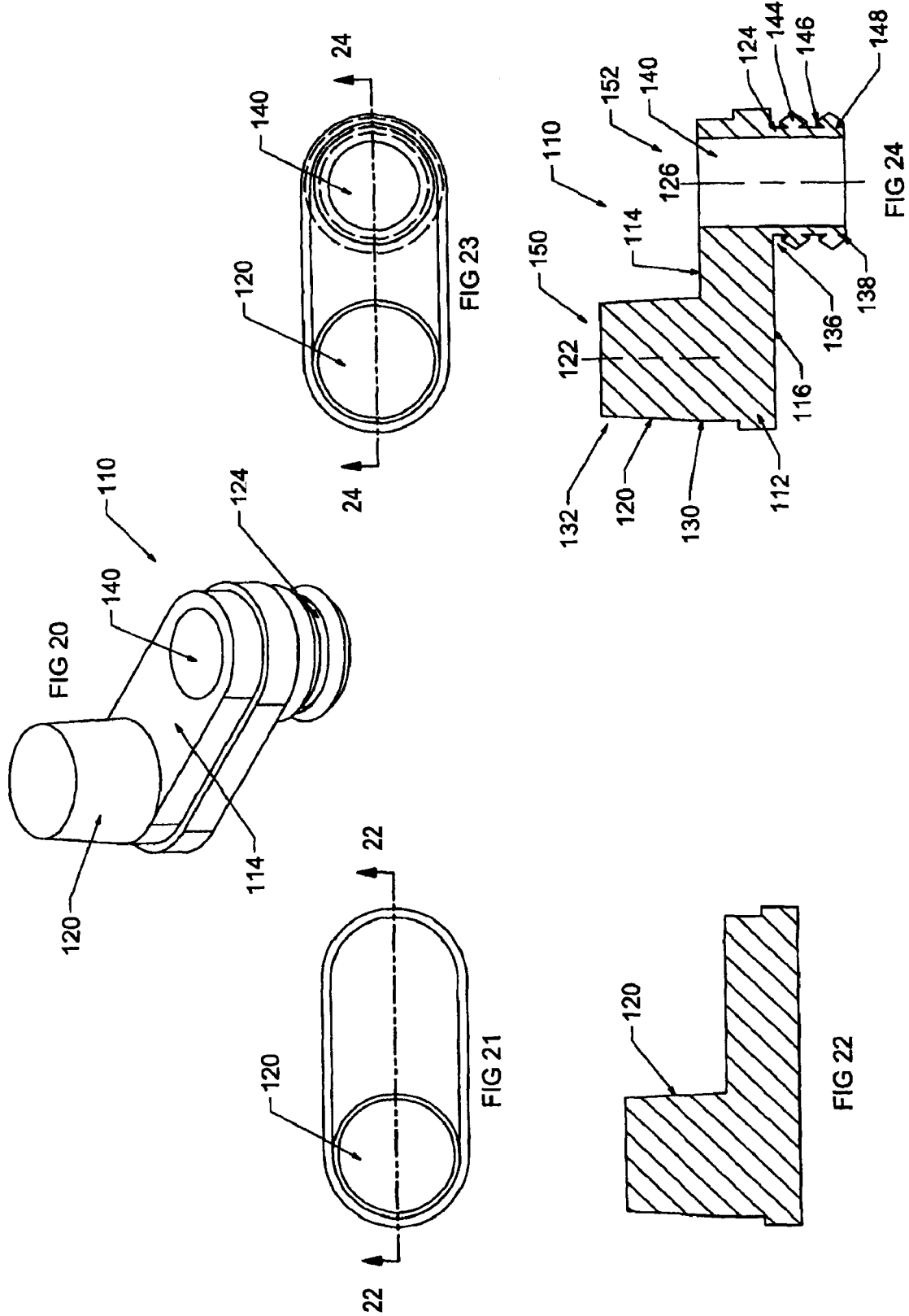

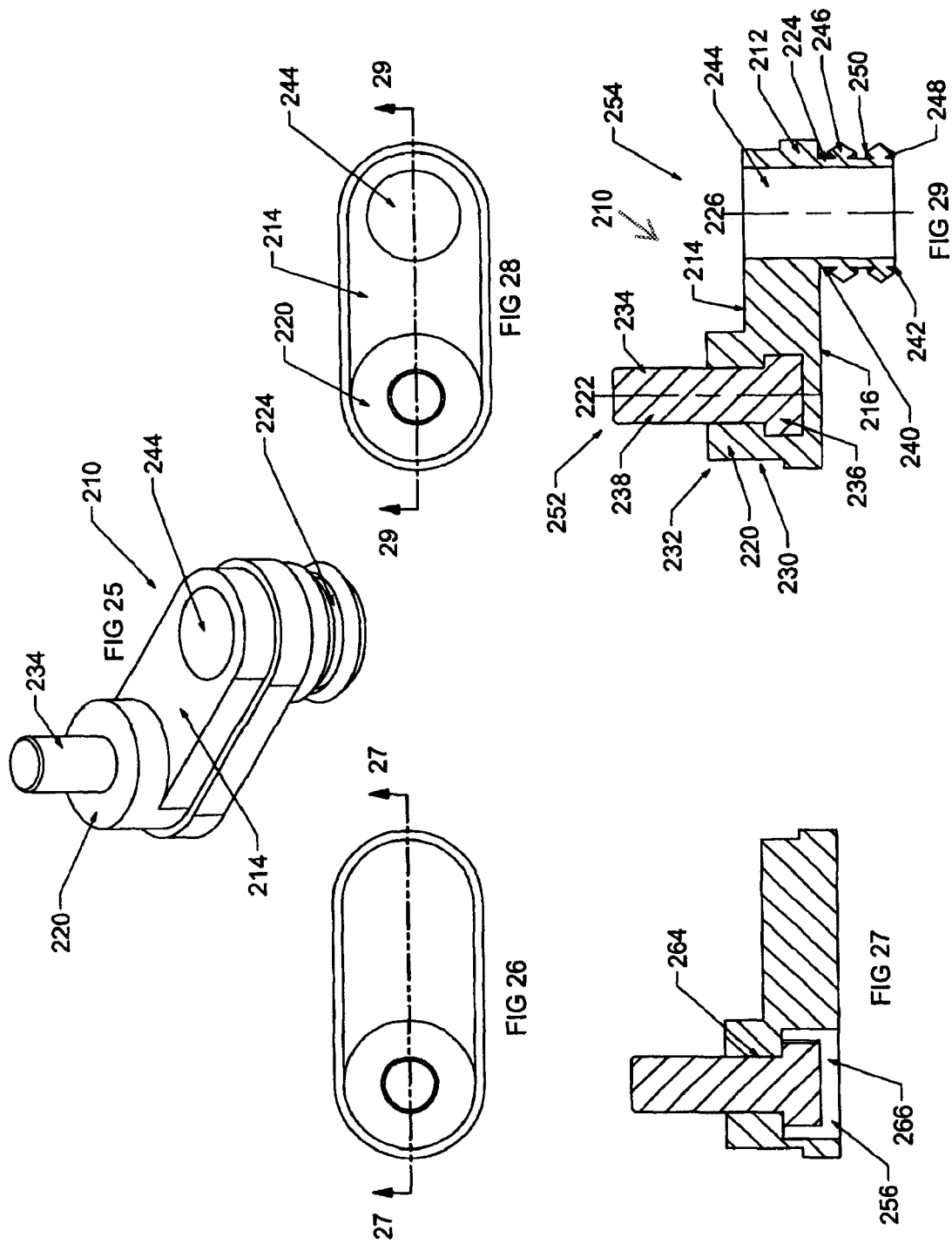

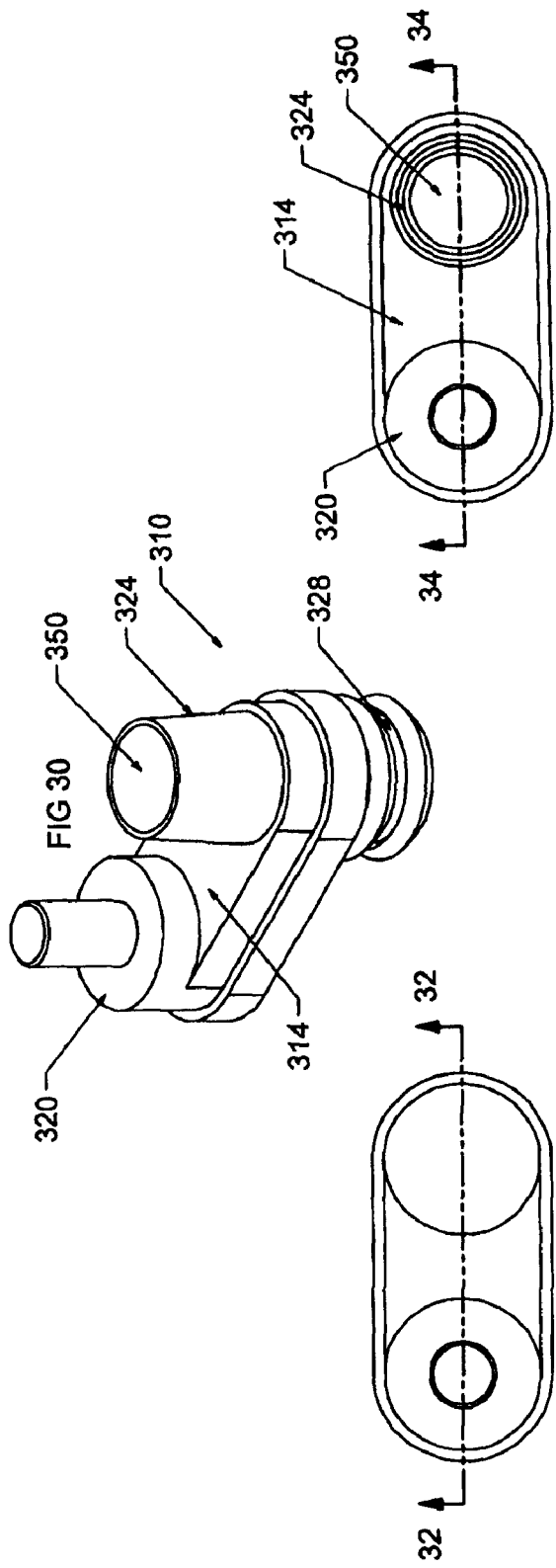
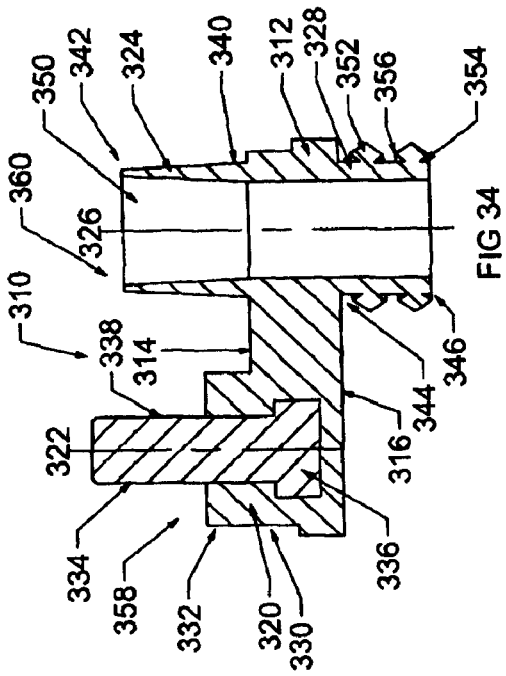
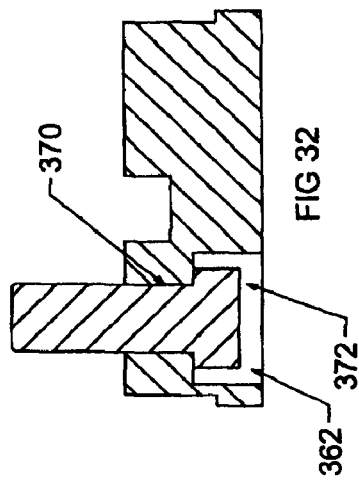

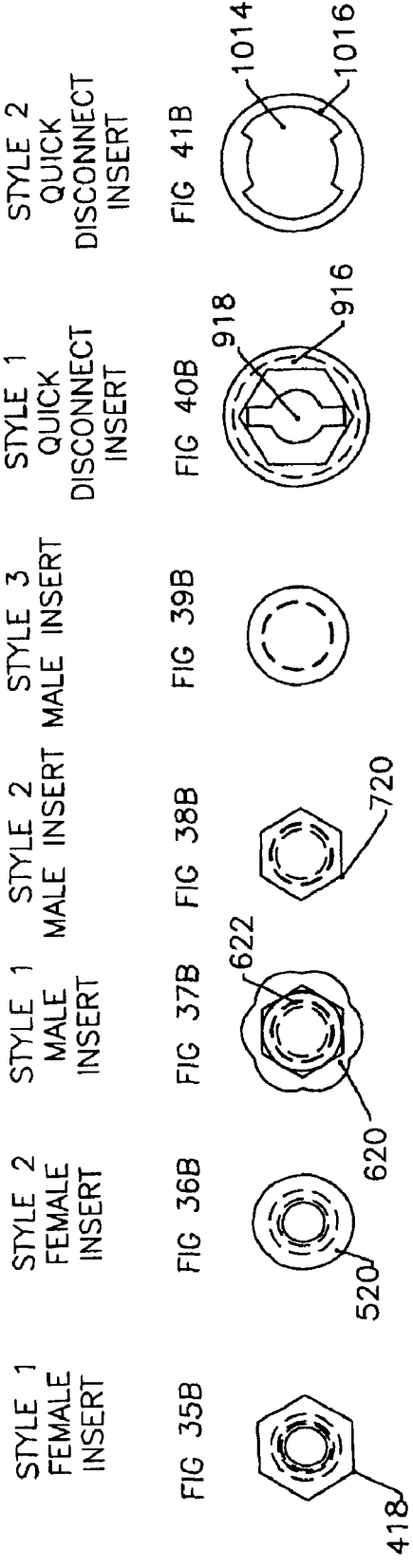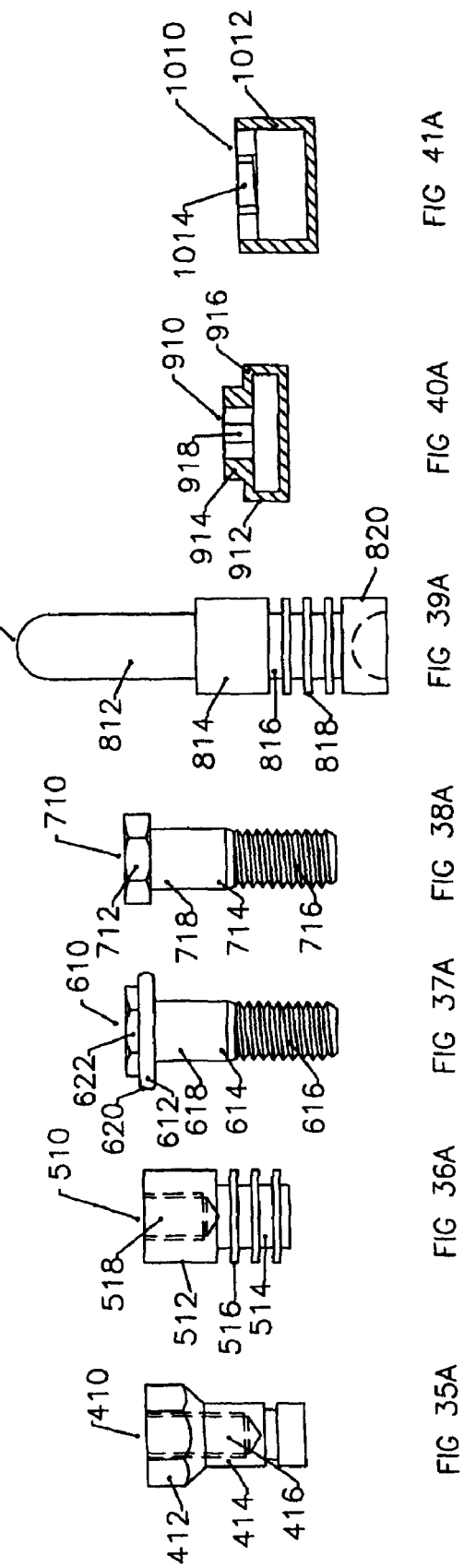

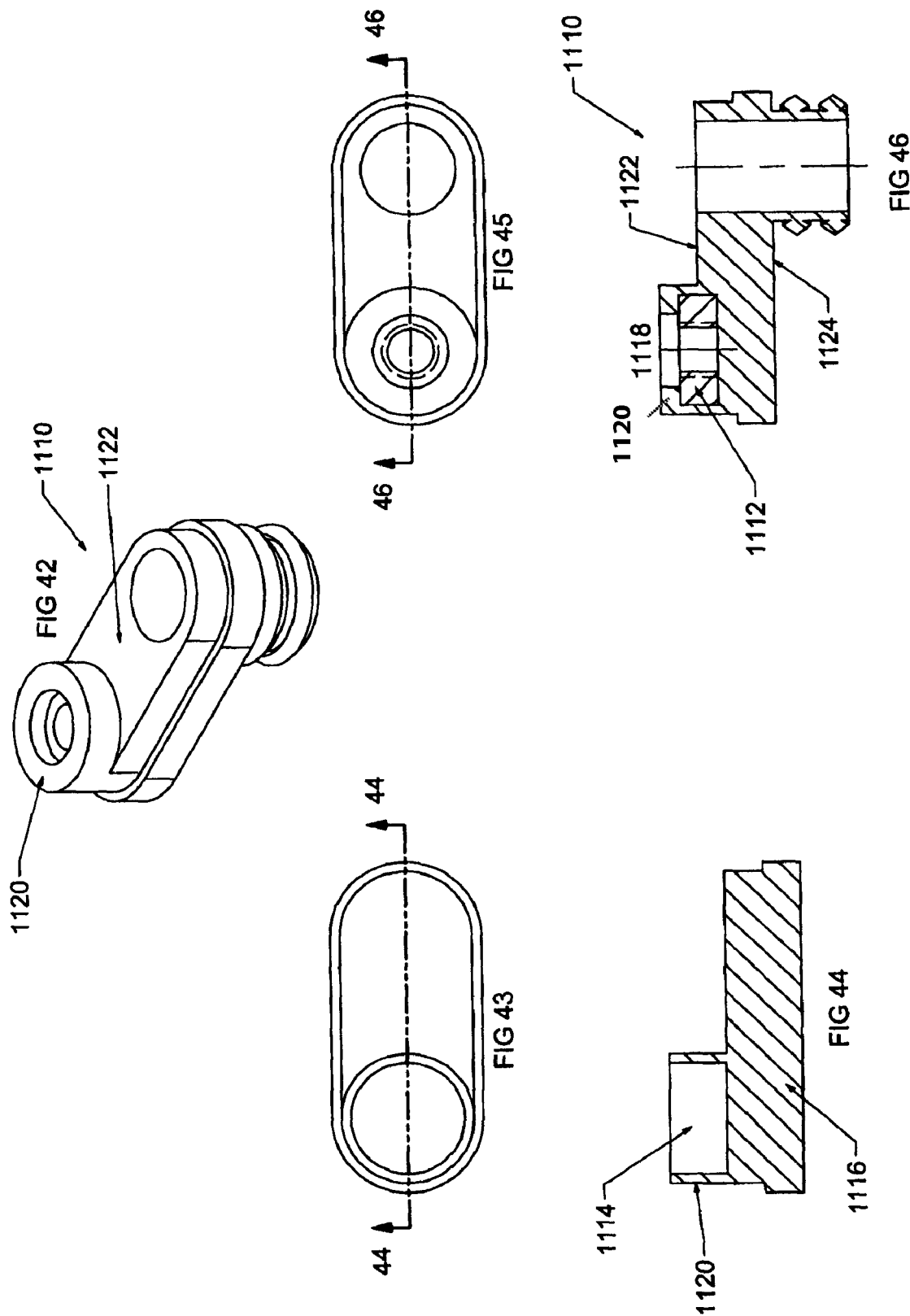

COLD FORMED BATTERY TERMINAL

CROSS-REFERENCE TO RELATED PATENT APPLICATIONS

This application is a continuation-in-part of U.S. patent application Ser. No. 11/268,497, filed Nov. 8, 2005, which is a continuation of U.S. patent application Ser. No. 10/162,059, filed Jun. 4, 2002, now U.S. Pat. No. 7,163,763, titled "Cold Formed Battery Terminal," all of which are incorporated herein by reference in their entirety.

BACKGROUND

The present invention relates generally to the field of battery terminals, and more specifically, the invention relates to a cold formed battery terminal having a male or female insert and a method and apparatus for forming the cold formed terminal.

In general battery terminals are utilized as an interface between a sealed battery container and an external device seeking electrical power. The interface between the terminal may include a female member such as a nut or a male member such as a stud that is embedded in the terminal. In sealed batteries containing liquid electrolyte, the battery terminal must be configured to prevent leakage of electrolyte to ensure the battery will not fail prematurely when called upon. To prevent leakage of electrolyte around a battery terminal it is common to provide a plurality of annular acid rings extending around the head of the battery terminal, which is designed to be embedded in the wall of the container.

Some terminal configurations, such as a marine battery terminal may place the male or female interface offset from the radial rings.

Battery terminals including annular rings on the head are typically formed from lead in a cold or hot forming process. In the hot forming process, a lead alloy is heated until it is in a molten state. The molten lead is then poured into a mold or casting and formed into a partially-finished or finished battery terminal. In the cold forming process a lead slug (typically at room temperature) is subjected to various pressing, punching and machining operations to create the finished battery terminal.

As mentioned above, the hot forming process requires that the lead be heated until it reaches the molten state and then subsequently poured into a multi-part mold until it cools. This is disadvantageous in that melting the lead alloy may create undesirable porosity in the finished battery terminal and is expensive to implement in an environmentally safe manner. The hot forming process can be employed to embed a male or female insert into the terminal while the terminal is being formed. U.S. Pat. No. 5,589,294 entitled "Side Wall Electrical Battery Terminal" and granted on Dec. 31, 1996 and commonly assigned with the instant invention discloses a cold formed terminal having a nut encapsulated in a terminal.

It would be desirable to have a terminal that is cold formed and including both annular rings and a male interface embedded in the terminal. It would also be desirable for the annular rings of the cold formed terminal to be offset from the embedded male or female insert.

SUMMARY

According to one embodiment a method for manufacturing a cold formed battery terminal, comprises providing a slug; cold forming the slug into a base having a first surface and an opposing second surface; cold forming a first extension, the first extension extending outwardly a distance from the first surface and the first extension substantially defining a first longitudinal axis; and cold forming a second extension, the second extension extending outwardly a distance from the second surface and the second extension substantially defining a second longitudinal axis, the second longitudinal axis being offset a distance from the first longitudinal axis.

According to another embodiment a method for manufacturing a cold formed battery terminal, comprises providing a slug; cold forming the slug into a base having a first surface and an opposing second surface; cold forming a first extension, the first extension extending outwardly a distance from the first surface and substantially defining a first longitudinal axis; cold forming a first aperture through the first extension; and cold forming a second extension, the second extension extending outwardly a second distance from the second surface and substantially defining a second longitudinal axis, the second longitudinal axis being substantially parallel to and offset a distance from the first longitudinal axis.

According to another embodiment a method for manufacturing a cold formed battery terminal, comprises providing a slug; cold forming the slug into a base having a first surface and an opposing a bottom surface; cold forming a first extension, the first extension extending outwardly a first distance from the first surface and substantially defining a first longitudinal axis; and cold forming a second extension, the second extension extending outwardly a second distance from the first surface and substantially defining a second longitudinal axis, the second distance being greater than the first distance and the second longitudinal axis being substantially parallel to and offset a distance from the first longitudinal axis.

BRIEF DESCRIPTION OF THE DRAWINGS

FIG. 1 is a cold formed terminal having an embedded insert.

FIG. 2 is the partially cold formed terminal after a first operation.

FIG. 3 is the partially cold formed terminal after a second operation.

FIG. 4 is the partially cold formed terminal after a third operation.

FIG. 5 is the partially cold formed terminal after a fourth operation.

FIG. 6 is the partially cold formed terminal after a fifth operation.

FIG. 7 is the partially cold formed terminal after a sixth operation.

FIG. 20 is an isometric view of yet another cold-formed battery terminal.

FIG. 21 is a top plan view of the cold formed battery terminal of FIG. 20 during manufacture.

FIG. 22 is a cross-sectional view of the cold formed battery terminal of FIG. 21 taken along line 22-22.

FIG. 23 is a top plan view of the cold formed battery terminal of FIG. 20.

FIG. 24 is a cross-sectional view of the cold formed battery terminal of FIG. 23 taken along line 24-24.

FIG. 25 is an isometric view of yet another cold-formed battery terminal.

FIG. 26 is a top plan view of the cold formed battery terminal of FIG. 25 during manufacture.

FIG. 27 is a cross-sectional view of the cold formed battery terminal of FIG. 26 taken along line 27-27.

FIG. 28 is a top plan view of the cold formed battery terminal of FIG. 25.

FIG. 29 is a cross-sectional view of the cold formed battery terminal of FIG. 28 taken along the line 29-29.

FIG. 30 is an isometric view of yet another cold-formed battery terminal.

FIG. 31 is a top plan view of the cold formed battery terminal of FIG. 30 during manufacture.

FIG. 32 is a cross-sectional view of the cold formed battery terminal of FIG. 31 taken along the line 32-32.

FIG. 33 is a top plan view of the cold formed battery terminal of FIG. 30.

FIG. 34 is a cross-sectional view of the cold formed battery terminal of FIG. 33 taken along line 34-34.

FIG. 35A is a side view of another exemplary insert.

FIG. 35B is a top view of the insert of FIG. 35A.

FIG. 36A is a side view of yet another exemplary insert.

FIG. 36B is a top view of the insert of FIG. 36A.

FIG. 37A is a side view of yet another exemplary insert.

FIG. 37B is a top view of the insert of FIG. 37A.

FIG. 38A is a side view of yet another exemplary insert.

FIG. 38B is a top view of the insert of FIG. 38A.

FIG. 39A is a side view of yet another exemplary insert.

FIG. 39B is a top view of the insert of FIG. 39A.

FIG. 40A is a side view of yet another exemplary insert.

FIG. 40B is a top view of the insert of FIG. 40A.

FIG. 41A is a side view of yet another exemplary insert.

FIG. 41B is a top view of the insert of FIG. 41A.

FIG. 42 is an isometric view of yet another cold-formed battery terminal.

FIG. 43 is a top plan view of the cold formed battery terminal of FIG. 42 during manufacture.

FIG. 44 is a cross-sectional view of the cold formed batter of FIG. 43 taken along line 44-44.

FIG. 45 is a top plan view of the cold formed battery terminal of FIG. 42.

FIG. 46 is a cross-sectional view of the cold formed batter of FIG. 43 taken along line 46-46.

DETAILED DESCRIPTION

Figure 8:
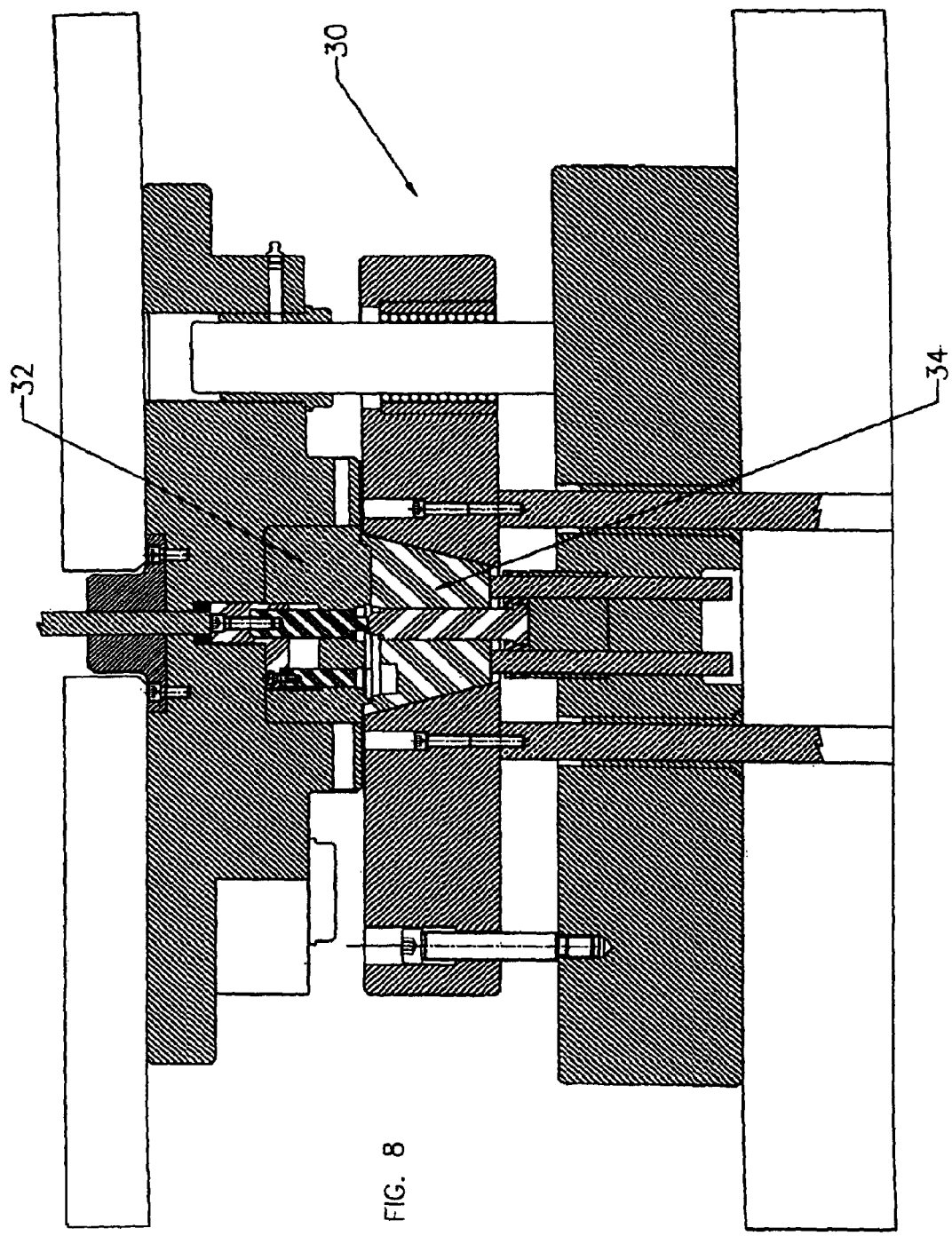
FIG. 8 is a schematic illustration of the die used in the first operation.

Referring to FIG. 1, a cold formed terminal 10 includes a base 12, an insert 14 and a plurality of acid rings 16. In one embodiment, the insert 14 is a male insert embedded in a raised extension 18, and extends above a first side 20 of the base 12. The rings 16 extend from the second side 22 of the base in a direction opposite the raised extension 18. The terminal includes a through hole 24 extending through the base and the acid rings 16. In one embodiment, the insert 14 is a hex bolt. However, the insert could be other types of extensions, such as a round bar, a non circular stud, or even an internal threaded insert such as nut or other female receptor for connecting another member. The radial axis of the insert 14 is offset from the radial axis of the acid rings 16. The base 12 further includes a top region 26 and a bottom region 28.

Referring to FIG. 2 and FIG. 8 the first operation of forming the cold formed terminal 10 is shown to begin with a single cylindrical lead slug, though, other slug shapes and/or materials may also be used. In one embodiment, the slug has a diameter of 0.855 inches. The slug is placed in a first die station 30 between an upper die 32 and a lower die 34. The cylindrical slug is cold formed or forged into a first partially formed terminal 36 having a first extension 18 provided with a recess 38 extending therein toward the base 12. A second co-axial recess 40 extends upward from the second side 22 of base 12 of the first partially formed terminal. The first recess 38 and second recess 40 are separated by a first plug 42. The second recess 40 includes an upper region 41 having a beveled wall terminating at plug 42. Surrounding the second recess 40 on the second side 22 of base 12 is a bottom extension 43 that will be used to seal the insert 14.

Referring to FIG. 3, in the second operation, the first partially formed terminal 36 is moved to a punching station in either a stand alone punch or in a second station in a progressive, transfer or multiple die station. A punch removes the plug 42 thereby providing a through hole 44 between the first recess 38 and second recess 40.

Referring to FIG. 4, in a third operation, the male insert or stud 14 having a head 46 is inserted within through hole 44, such that head 46 is located within second recess 40, and an end portion 48 of stud 14 extends through hole 44 and above raised extension 18.

Figure 9:
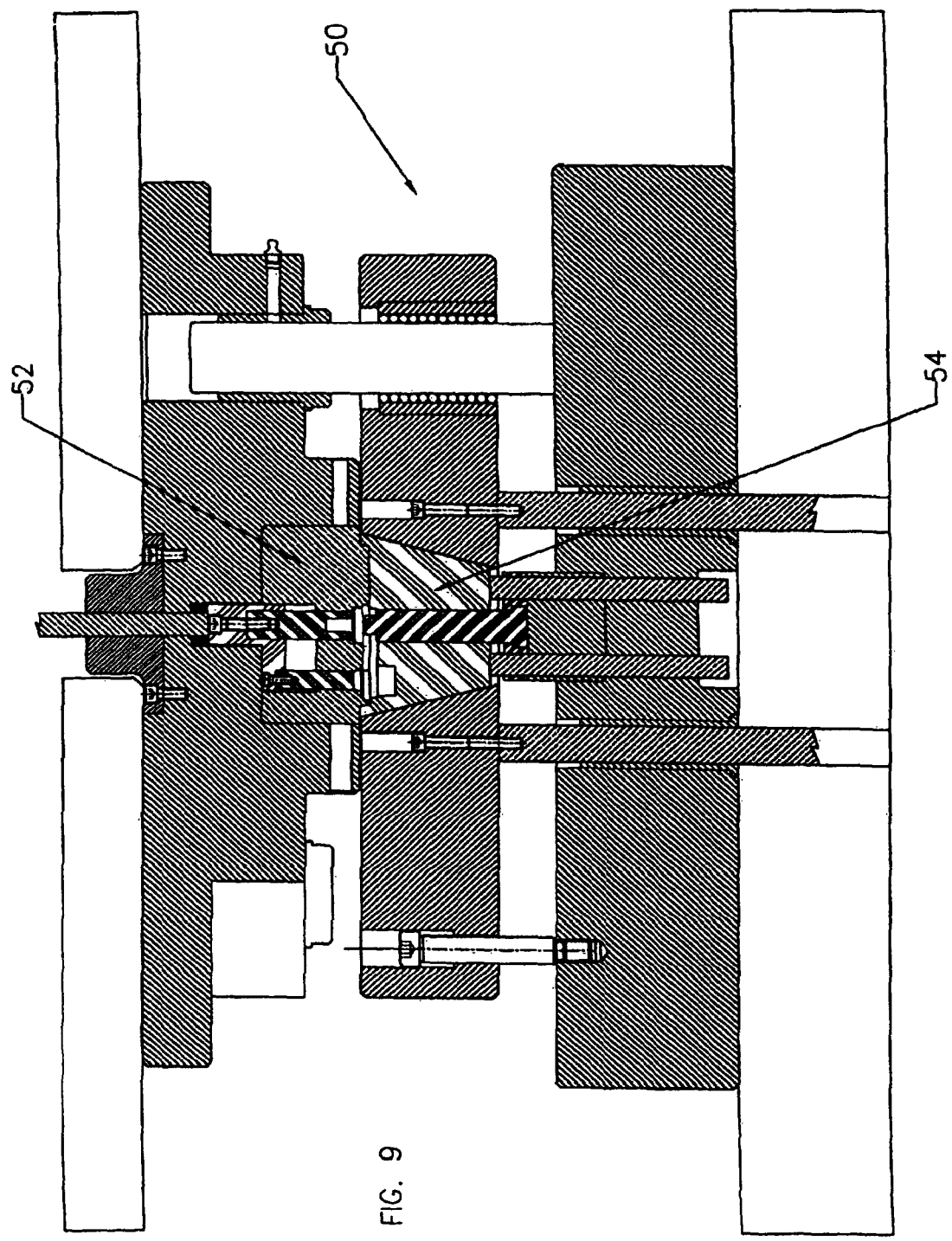
FIG. 9 is a schematic illustration of the die used in the fourth operation.

Referring to FIGS. 5 and 9, the male insert 14 is pressed into through hole 44 in a fourth die station 50 between upper die 52 and a lower die 54. The first side 52 of head 46 is seated within the upper region 41 of second recess 40. As the head 46 is seated within through hole 44, the beveled walls 53 of upper region 41 flow around the outer periphery of the head 46.

Figure 10:
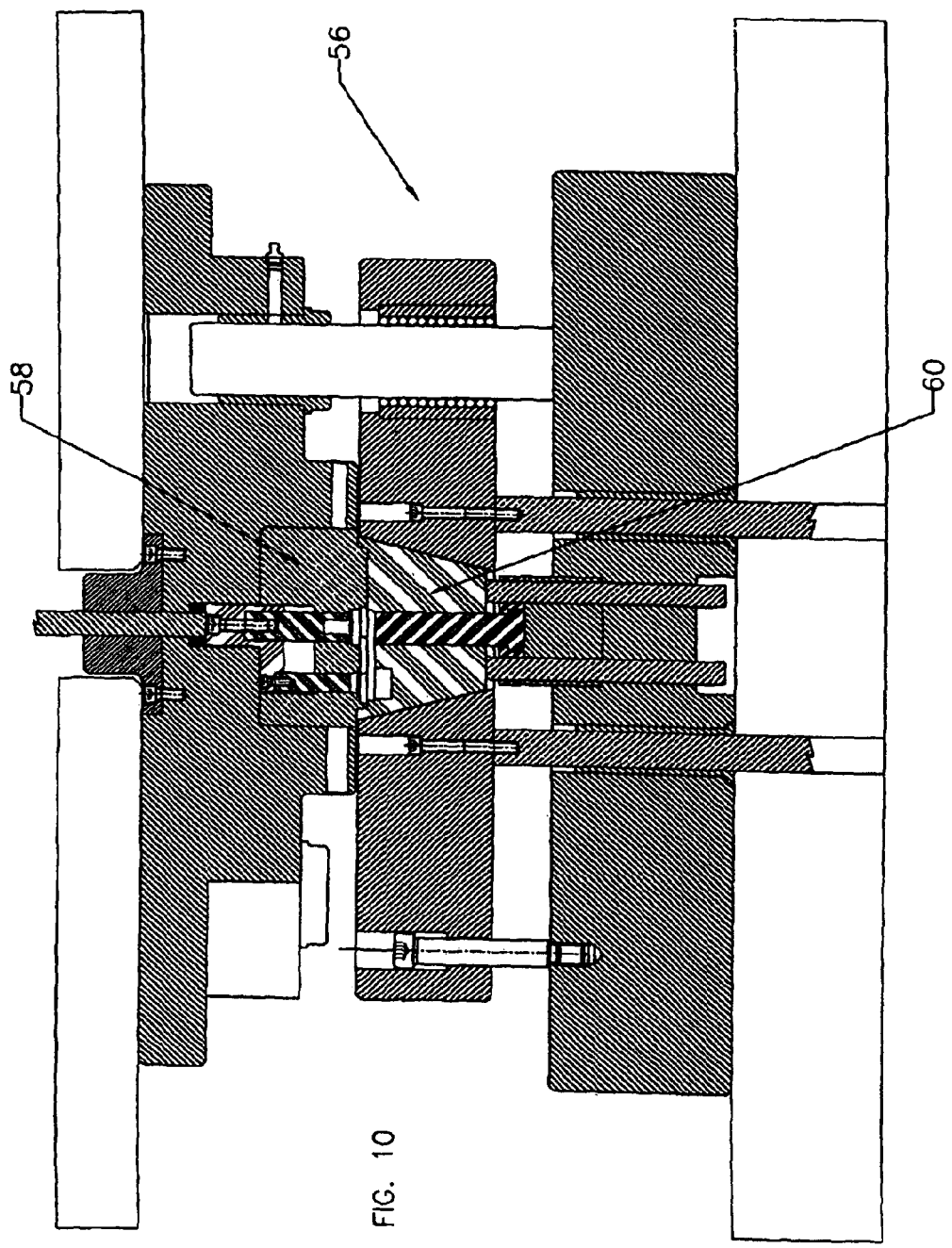
FIG. 10 is a schematic illustration of the die used in the fifth operation.

Referring to FIGS. 6 and 10, the bottom extension 43 is forged into lower recess 40 to seal the head 46 of insert 14 within the base 12. The flow of the bottom extension 43 into the recess 40 is accomplished in the fifth die station 56 with an upper die 58 and a lower die 60. This fifth operation substantially seals the insert within the through hole 44. As a result of the of the fifth die station through hole 44 is substantially closed proximate the head 46.

Figure 11:
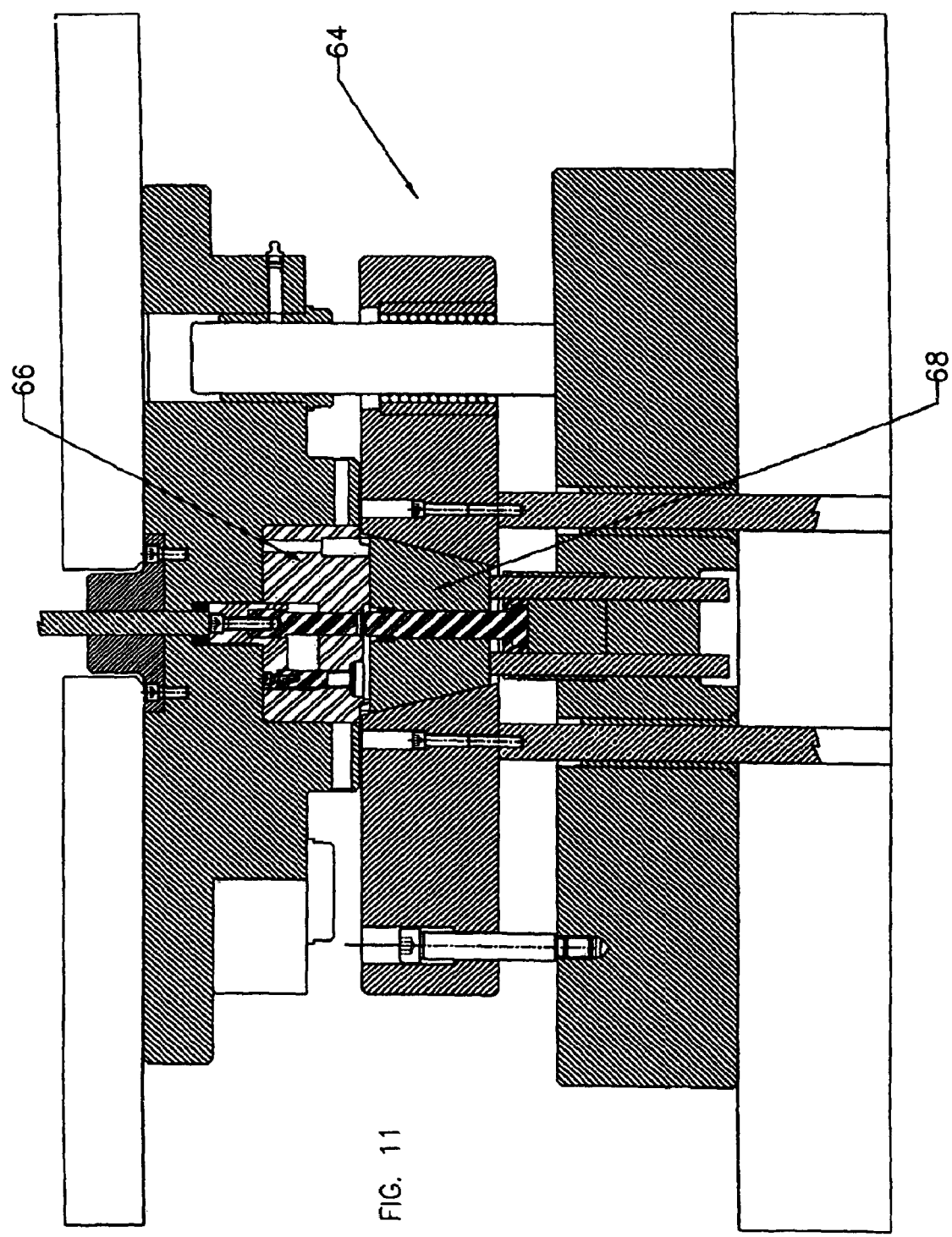
FIG. 11 is a schematic illustration of the die used in the sixth operation.

A plurality of acid rings 16 are formed on a lower extension 62 in a sixth operation. Referring to FIG. 11 a sixth die station 64 includes an upper die 66 and a lower split die 68. The orientation of the terminal is reversed in the sixth die station such that the center of the upper die 66 is co-axial with the axis of the acid rings and offset from the longitudinal axis of the insert. As illustrated in FIG. 7, the longitudinal axis of extension 62 is offset from longitudinal axis of the insert. Additionally, the lower extension 62 and acid rings 16 are located on the second side 22 of the base 12 which is opposite of the insert 14. The lower extension 62 includes an internal upper plug 70 proximate the first side 20 of the base 12.

In a seventh operation, the upper plug 70 is punched from the lower extension 62 to form through hole 24. The resultant terminal 10 is illustrated in FIG. 1.

The seven operations outlined above, may all take place in seven separate stations. However, the seven operations may be formed with a single progressive, transfer, or multiple die station. Alternatively, any combination of operations may be combined in a single press. In the preferred embodiment, a single progressive die is employed. Each operation outlined above would be located on a single die system, such that a pick and place robot would move each component simultaneously to the next station. For example, a first pick and place robot or vibratory delivery mechanism would present the cylindrical lead slug to the first die station 30. Once the first operation was complete, the processed slug would be moved from the first die station 30 to a second die station. A lower die in the second die station supports the bottom 22 of the component, and a punch would be lowered simultaneously, with the processing of a new cylindrical lead slug in the first die station 30. It should be noted, however, that other slug shapes and/or materials may also be used according to other exemplary embodiments.

A pick and place mechanism could move each component individually or simultaneously. Once the forged and punched terminal is moved to the third die station, an insert 14 is located within lower recess 40. In the fourth die station 50, the component is pressed between dies 52 and 54 to fully seat the head 46 of insert 14 within recess 40.

Once the insert is fully seated within lower recess 40, the component is moved to the fifth die station 56 and located between an upper die 58 and lower die 60. When the press is activated, the bottom extension 43 is forged such that the material that constitutes bottom extension 43 fills in the recess 40 and seals the head 46 of insert 14 to the base 12.

The component from the fifth operation is then moved to the sixth operation simultaneously with all of the other processed components. The orientation of the component is rotated one hundred and eighty degrees so that the insert is no longer in the center of the sixth die station but is offset from the longitudinal axis of the split lower die 68. This new orientation permits acid rings 16 to be formed during the cycle of the press.

Once the acid rings 16 have been formed in the split die 68, the nearly formed terminal is transferred to the final seventh operation in which the plug 70 is removed forming a hole through the base and the bottom extension with the external acid rings.

The simultaneous processing of the terminals reduce the number of presses required and ensure that all of the components are being processed at the same rate. Some or all of the steps can be included in a single press with an upper and lower set of dies. A transfer mechanism may be employed to move the components to each successive station.

Figure 15:
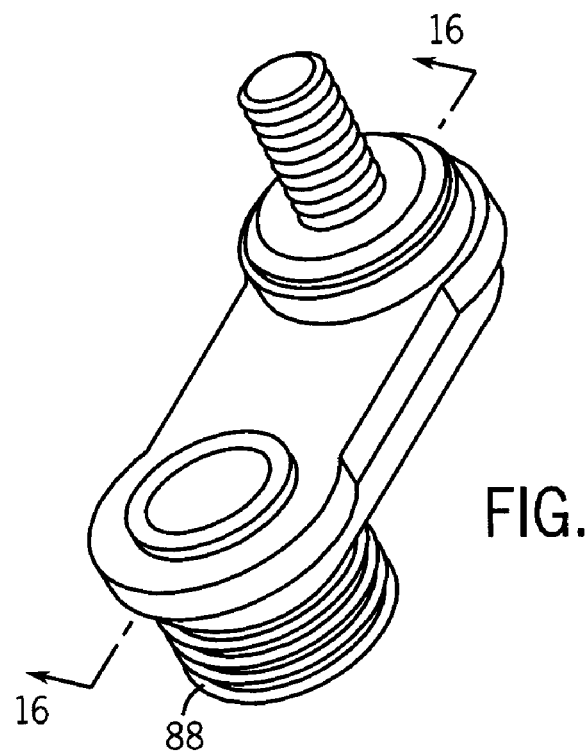
FIG. 15 is an isometric view of a cold formed terminal with under cut acid rings.
Figure 16:
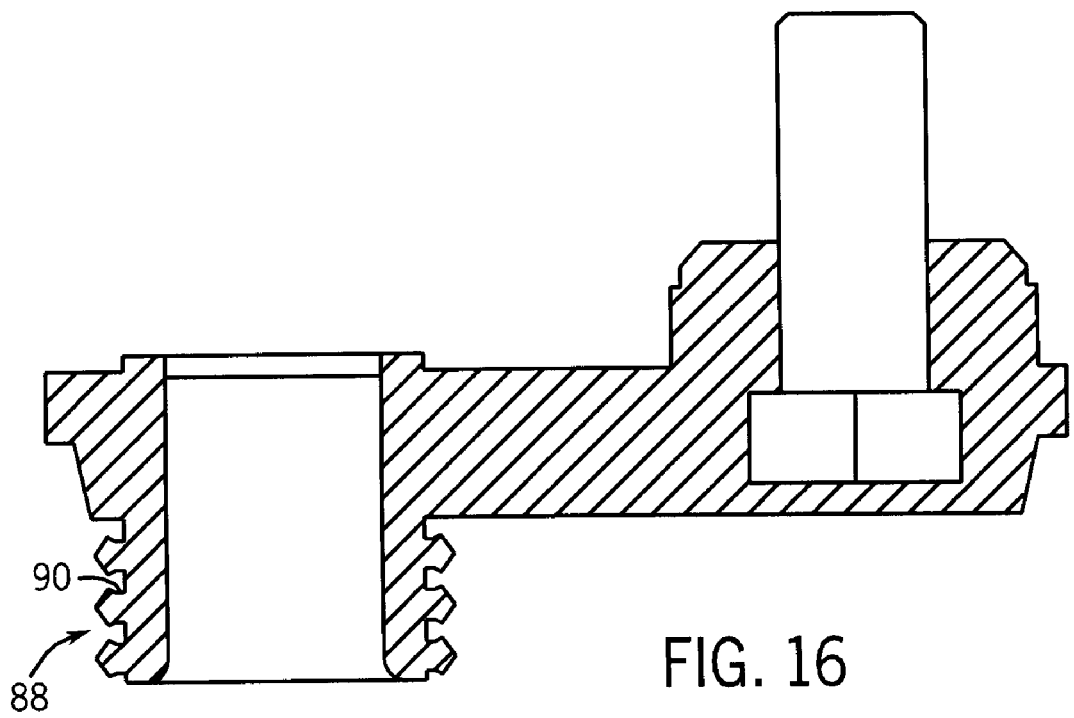
FIG. 16 is a cross section taken generally along lines 16-16 of FIG. 15.

As illustrated in FIGS. 15 and 16, the finished terminal may include radial rings 88 having an undercut 90. The undercut 90 may be formed by the apparatus and process outlined in U.S. Pat. No. 6,644,084, titled "Method and Apparatus for Manufacturing a Battery Terminal with Undercut Rings," filed Jun. 14, 2001, issued on Nov. 11, 2003, and incorporated herein by reference in its entirety.

Figure 17:
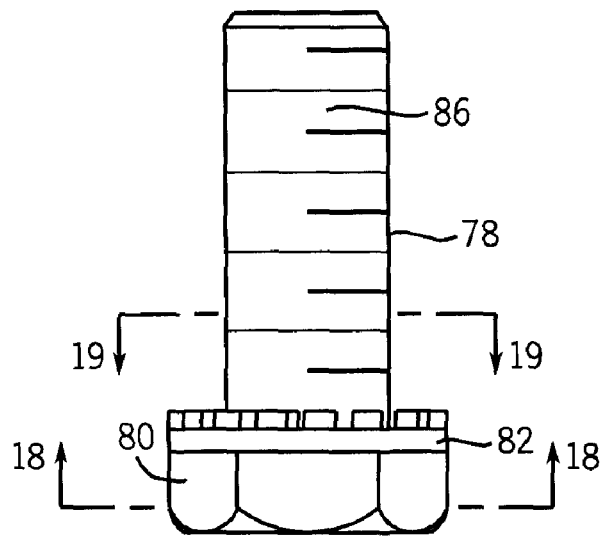
FIG. 17 is an isometric view of an exemplary insert.
Figure 18:
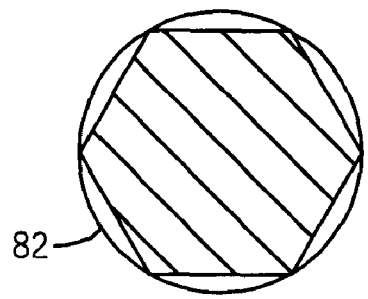
FIG. 18 is a cross section taken generally along lines 18-18 of FIG. 17.
Figure 19:
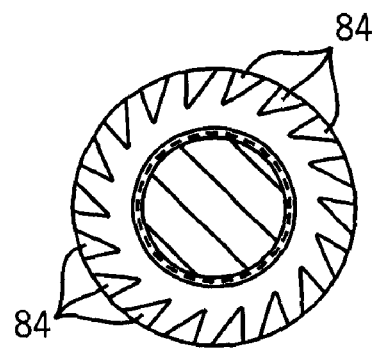
FIG. 19 is a cross section taken generally along lines 19-19 of FIG. 17.

Referring to FIG. 17, one exemplary embodiment of insert 14 includes a threaded extension 78 and a hex shaped head 80. An insert axis 86 is defined as the axis extending along the length of the extension 78. In order to minimize the possibility of the insert from being stripped from the base in the direction of the insert axis, a flange 82 is added to the hex shaped head 80. Flange 82 adds additional surface area that is encapsulated within the base of the terminal to resist movement of the insert in the insert axis direction. Additionally, serrations 84 may be added to the head 80 and/or to flange 82 to prevent rotation of the insert about its axis. In one embodiment, the serrations 84 are curved to prevent clockwise rotation of the bolt. This resists rotation of the insert as a clamp is being applied to the extension member. Of course the serrations 84 could be curved in the opposite direction if counterclockwise rotation was to be prevented. Alternatively, serration could be added that would prevent rotation in both directions. Other type of indentations about the periphery of the head are also contemplated to avoid rotation of the insert within the lead base. Further, indentations may be located on the terminal end of the head or on the portion of the head proximate the extension.

Figure 12:
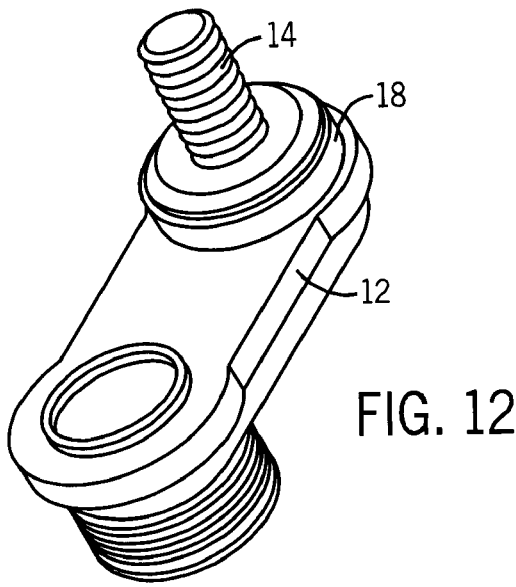
FIG. 12 is an isometric view of the cold formed terminal.
Figure 13:
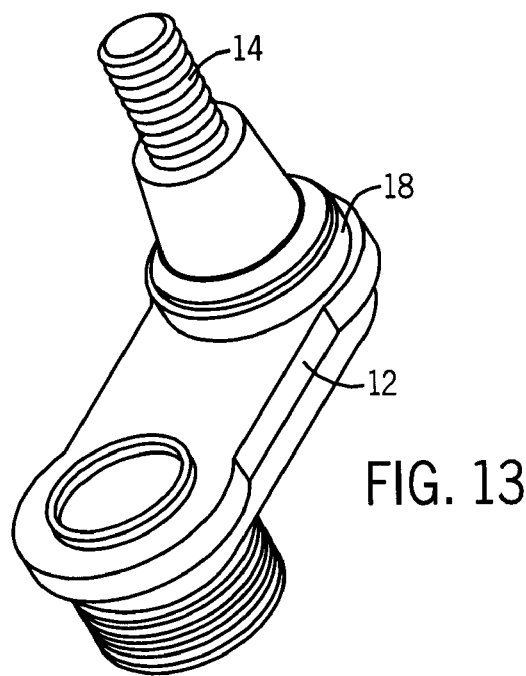
FIG. 13 is an isometric view of another cold formed terminal.
Figure 14:
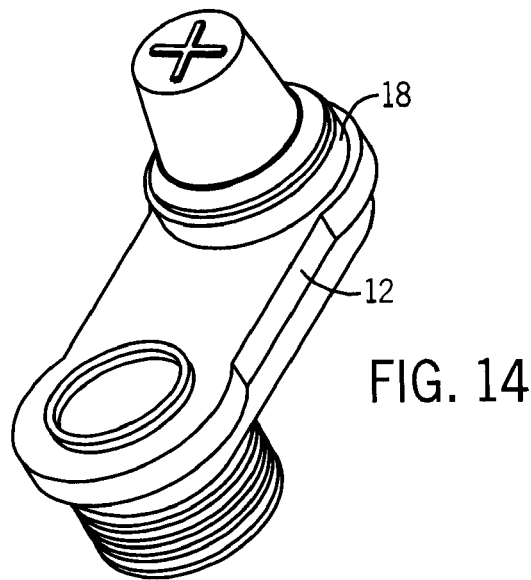
FIG. 14 is an isometric view of yet another cold formed terminal.

Although the invention has been described in conjunction with specific embodiments thereof, it is evident that alternatives, modifications and variations will be apparent to those skilled in the art. For example as illustrated in FIGS. 13 and 14, a battery terminal may be formed in which the first extension extends a greater distance from the base, then the extension of FIG. 12. Additionally, the insert may not extend beyond the first extension as illustrated in FIG. 14 or may be done away with altogether. It is intended that the claims embrace these and other alternatives, modifications and variations which fall within the spirit and scope of the appended claims.

Referring to FIGS. 20-24, a cold formed battery terminal 110 is shown including a base 112 having a first surface or side 114 and an opposing second surface or side 116 according to an exemplary embodiment. A first extension 120 is shown extending outwardly a distance from the first surface 114 and substantially defining a first longitudinal axis 122. A second extension 124 is shown extending outwardly a distance from the second surface 116 and substantially defining a second longitudinal axis 126. The second axis 126 is shown substantially parallel to and offset a distance from the first axis 122. According to other exemplary embodiments, however, a first axis defined by a first extension and a second axis defined by a second extension may be disposed at angles relative to each other (e.g., 30 degrees, 2 degrees, etc.)

The first extension 120 is shown tapered generally from a first portion 130 disposed proximate to the first surface 114 to a second portion 132 disposed distal to the first surface 114. According to other exemplary embodiments, the first extension may be otherwise configured. For example, the first extension may not be tapered, may be partially tapered, may extend a greater distance outward from the first surface of the base, may have a symmetrical radial cross-section and/or longitudinal cross-section, may have an asymmetrical radial cross-section and/or longitudinal cross-section, etc.

The second extension 124 includes first portion 136 disposed proximate to the second surface 116, a second portion 138 disposed distal to the second surface, and an aperture or through hole 140 extending therethrough. The aperture 140 (e.g., passage, opening, through hole, etc.) is shown substantially coaxial with the second extension 124 and the second axis 126. The aperture 140 is also shown extending through the second extension 124 to the first surface 114 of the base 112. The portion of the aperture 140 extending through the second portion 138 is shown at least partially tapered.

FIG. 24 shows the second extension 124 further including at least one acid ring, shown as a plurality of acid rings 144 extending substantially circumferentially thereabout. Each ring 144 is shown having a substantially symmetrical arrowhead cross-section, an inner or first portion 146, and an outer or second portion 148. The first portion 146 of each ring 144 is shown a first distance from the second axis 126 and the second portion 148 is shown a second distance from the second axis 126, the second distance being greater than the first distance. These distances are typically radial distances, being measured substantially perpendicular to the second longitudinal axis, but may be otherwise defined or measured (e.g., the distances being measured along a line that is not perpendicular to the longitudinal axis, etc.). In other exemplary embodiments, the rings may be otherwise configured. For example, the rings may have other cross sections (e.g., rectangular, mushroom-shaped, etc.) and/or be non-symmetrical.

The first extension 120 substantially defines an electrical coupling portion 150 of the cold formed battery terminal 110. The second extension 124 substantially defines a battery coupling portion 152 of the cold formed battery terminal 110. The electrical coupling portion 150 is shown disposed substantially adjacent to the battery coupling portion 152 of the cold formed battery terminal 110.

According to an exemplary method for manufacturing a cold formed battery terminal, the cold formed battery terminal 110 is formed from a slug to a finished battery terminal in four operations. The slug may be substantially cylindrical or otherwise shaped. In a first operation, the slug is formed into the base 112, the first extension 120 is partially formed, and the aperture 140 is partially formed. The aperture 140 extends substantially along the second axis 126. In a second operation, the first extension 120 is completed. In a third operation, the second extension 124 is formed and aperture 140 is completed, being cold formed to extend through the second extension 124 to the first surface 114 of the base 112. In a fourth operation, the rings 144 are formed circumferentially about the second extension 124.

The rings of this or any other embodiment within the scope of this disclosure may be formed in part or in whole by any of the methods and apparatuses described in U.S. patent application Ser. No. 12/611,000, filed Nov. 2, 2009; U.S. Pat. No. 7,628,049, filed Mar. 24, 2006, issued on Dec. 8, 2009; U.S. Pat. No. 7,021,101, filed Jul. 8, 2003, issued on Apr. 4, 2006; and U.S. Pat. No. 6,644,084, filed Jun. 14, 2001, issued on Nov. 11, 2003, each being entitled "Method and Apparatus for Manufacturing a Battery Terminal with Undercut Rings," and incorporated herein by reference in its entirety. For example, cold forming the acid ring may include cold forming each acid ring from a first shape (e.g., having rectangular cross section, having a first substantially symmetrical cross section, etc.) to a second shape (e.g., having arrowhead cross section, having a second substantially symmetrical cross section, etc.). The first shape may include a first shape inner portion closer to the second longitudinal axis than a first shape outer portion. The first shape inner portion may have a first inner width at least as wide as a first outer width of the first shape outer portion. The second shape may include a second shape inner portion closer to the second longitudinal axis than a second shape outer portion. The second shape outer portion may include a second outer width greater than a second inner width of the second shape inner portion. In another exemplary embodiment, cold forming at least one acid ring may include cold forming the acid ring from a first shape to a second shape (e.g., using a first cold forming member and a second cold forming member). The acid ring may include a first portion a first distance from the second longitudinal axis and a second portion a second distance from the second longitudinal axis, the second distance being greater than the first distance. When in the first shape, the first portion may include a first width being at least as wide as a first width of the second portion. When in the second shape, the second portion may include a second width greater than the second width of the first portion. Further, the rings may be formed and/or have any of the configurations described in these references.

In other exemplary embodiments, one or more of the operations discussed above in reference to the exemplary method of manufacturing a cold formed battery terminal may be combined into a single operation and/or may be split into two or more separate operations. Further, additional intermediate steps and/or finishing steps may be included.

Referring to FIGS. 25-29, a cold formed battery terminal 210 is shown including a base 212 having a first surface or side 214 and an opposing second surface or side 216 according to an exemplary embodiment. A first extension 220 is shown extending outwardly a distance from the first surface 214 and substantially defining a first longitudinal axis 222. A second extension 224 is shown extending outwardly a distance from the second surface 216 and substantially defining a second longitudinal axis 226. The second axis 226 is shown substantially parallel to and offset a distance from the first axis 222.

The first extension 220 is shown including a first portion 230 disposed proximate to the first surface 214 and a second portion 232 disposed distal to the first surface 214. Referring to FIGS. 27 and 29, an insert shown as a male fastener 234 is shown at least partially encapsulated in the first extension 220. The male fastener 234 includes a head 236 and a shaft 238 that are substantially coaxial with the first extension 220 and the first axis 222. The head 236 is disposed generally within the base 212, a portion of the base 212 being both thereabove and therebelow to help retain the male fastener 234 in a desired position. The shaft 238 is shown extending outwardly from the first surface 214 along the first axis 222 a greater distance than the first extension 220 extends outwardly from the first surface 214. According to other exemplary embodiments, the insert may be a male or female insert, including, but not limited to a threaded nut, a bolt, or a screw.

The second extension 224 is shown including a first portion 240 disposed proximate to the second surface 216, a second portion 242 disposed distal to the second surface, and an aperture 244 extending therethrough. The aperture 244 (e.g., passage, opening, through hole, etc.) is shown substantially coaxial with the second extension 224 and the second axis 226, extending through the second extension 224 to the first surface 214 of the base 212.

FIG. 29 shows the second extension 224 further including at least one acid ring shown as a plurality of acid rings 246 extending substantially circumferentially thereabout. Each ring 246 is shown having a substantially symmetrical arrowhead cross-section, an inner or first portion 248, and an outer or second portion 250. The first portion 248 of each ring 246 is shown a first distance from the second axis 226 and the second portion 250 is shown a second distance from the second axis 226, the second distance being greater than the first distance. These distances are typically radial distances, being measured substantially perpendicular to the second longitudinal axis, but may be otherwise defined or measured (e.g., the distances being measured along a line that is not perpendicular to the longitudinal axis, etc.). In other exemplary embodiments, the rings may be otherwise configured. For example, the rings may have other cross sections (e.g., rectangular, mushroom-shaped, etc.) and/or be non-symmetrical.

The first extension 220 substantially defines an electrical coupling portion 252 of the cold formed battery terminal 210. The second extension 124 substantially defines a battery coupling portion 254 of the cold formed battery terminal 210. The electrical coupling portion 252 is shown disposed substantially adjacent to the battery coupling portion 254 of the cold formed battery terminal 210.

According to an exemplary method for manufacturing a cold formed battery terminal, cold formed battery terminal 210 is formed from a slug to a finished battery terminal in seven operations.

In a first operation, the slug is formed into the base 212, the first extension 220 is partially formed, and an aperture 256 is partially formed. The aperture 256 extends substantially along the first axis 222.

In a second operation, the aperture 256 is further partially formed by cold forming a first recess and a second recess that are substantially coaxial with the first extension 220 and the first axis 222. A plug or wall is disposed between and separates the first recess and the second recess.

In a third operation, the plug is removed from between the first recess and the second recess to form the aperture 256. The aperture 256 is shown extending through the first extension 220 along the first axis 222 and includes a first portion 264 having a first cross section and a second portion 266 having a second cross section, the second cross section being larger than the first cross section.

In a fourth operation, the male fastener 234 is disposed into the aperture 256. The head 236 of the male fastener 234 is received within the second portion 266 of the aperture 256. The shaft 238 of the male fastener 234 is disposed at least partially within the first portion 264 of the aperture 256, extending outwardly a distance from the second portion 232 of the first extension 220.

In a fifth operation, at least a portion of the male fastener 234 is at least partially encapsulated within aperture 256 by cold forming a portion of base 212 to substantially surround and confine the head 236 and a portion of the shaft 238 of the male fastener 234 therewithin.

In a sixth operation, the second extension 224 and the aperture 244 extending therethrough are formed.

In a seventh operation, the rings 246 are formed circumferentially about the second extension 224.

In other exemplary embodiments, one or more of the operations discussed above in reference to the exemplary method of manufacturing a cold formed battery terminal may be combined into a single operation and/or one or more of the operations may be split into two or more separate operations. Further, additional intermediate steps and/or finishing steps may be included.

Referring to FIGS. 30-34 a cold formed battery terminal 310 is shown including a base 312 having a first surface or side 314 and an opposing second surface or side 316 according to an exemplary embodiment. A first extension 320 is shown extending outwardly a distance from the first surface 314 and substantially defining a first longitudinal axis 322. A second extension 324 is shown extending outwardly a distance from the first surface 314 and substantially defining a second longitudinal axis 326. A third extension 328 is shown extending outwardly a distance from the second surface 216 and being substantially coaxial with the second extension 324 along the second axis 326. The second axis 326 is shown substantially parallel to and offset a distance from the first axis 322.

The first extension 320 is shown including a first portion 330 disposed proximate to the first surface 314 and a second portion 332 disposed distal to the first surface 314. Further, an insert shown as a male fastener 334 is shown at least partially encapsulated in the first extension 320. Referring to FIGS. 32 and 34, male fastener 334 includes a head 336 and a shaft 338 that are substantially coaxial with the first extension 320 and the first axis 322. The head 336 is shown disposed substantially within the base 312, a portion of the base 312 being both thereabove and therebelow to help retain the male fastener 334 in a desired position. The shaft 338 is shown extending outwardly from the first surface 314 along the first axis 322 a greater distance than the first extension 320 extends outwardly from the first surface 314. According to other exemplary embodiments, the insert may be a male or female insert, including, but not limited to a threaded nut, a bolt, or a screw.

The second extension 324 is shown including a first portion 340 disposed proximate to the first surface 314 and a second portion 342 disposed distal to the first surface 314. According to other exemplary embodiments, the second extension may be otherwise configured. For example, the second extension may not be tapered, may extend a greater distance outward from the first surface of the base, etc.

The third extension 328 is shown including a first portion 344 disposed proximate to the second surface 316 and a second portion 346 disposed distal to the second surface 36.

An aperture 350 is shown extending through both the second extension 324 and the third extension 328 substantially along the second axis 326. A portion of the aperture 350 substantially corresponding to the second portion 342 of the third extension 328 is shown at least partially tapered, though, according to other exemplary embodiments, may be otherwise configured (e.g., have a substantially constant radius along the second axis, etc.).

Referring to FIG. 34, the third extension 328 is shown further including at least one acid ring shown as a plurality of acid rings 352 extending substantially circumferentially thereabout. Each ring 352 is shown having a substantially symmetrical arrowhead cross-section, an inner or first portion 354, and an outer or second portion 356. The first portion 354 of each ring 352 is shown a first distance from the second axis 326 and the second portion 356 is shown a second distance from the second axis 326, the second distance being greater than the first distance. These distances are typically radial distances which are substantially perpendicular to the second longitudinal axis, but may be otherwise defined or measured (e.g., the distances being measured along a line that is not perpendicular to the longitudinal axis, etc.). In other exemplary embodiments, the rings may be otherwise configured. For example, the rings may have other cross sections (e.g., rectangular, mushroom-shaped, etc.) and/or be non-symmetrical.

The first extension 320 substantially defines an electrical coupling portion 358 of the cold formed battery terminal 310. The second extension 324 and the third extension 328 substantially define a battery coupling portion 360 of the cold formed battery terminal 310. The electrical coupling portion 358 is shown substantially adjacent to the battery coupling portion 360 of the cold formed battery terminal 310.

According to an exemplary method for manufacturing a cold formed battery terminal, cold formed battery terminal 310 is formed from a slug to a finished battery terminal in seven operations.

In a first operation, the slug is formed into the base 312, the first extension 320 is partially formed, and the second extension 324 is partially formed.

In a second operation, an aperture 362 is partially formed by cold forming a first recess and a second recess that are substantially coaxial with the first extension 320 along the first axis 322. A plug or wall is disposed between and separates the first recess and the second recess.

In a third operation, the plug is removed from between the first recess and the second recess to form the aperture 362. The aperture 362 extends through the first extension 320 along the first axis 322 and includes a first portion 370 having a first cross section and a second portion 372 having a second cross section, the second cross section being larger than the first cross section.

In a fourth operation, the male fastener 334 is disposed into the aperture 362. The head 336 of the male fastener 334 is received within the second portion 372 of the aperture 362.

The shaft 338 of the male fastener 334 is disposed at least partially within the first portion 370 of the aperture 362, extending outwardly a distance from the second portion 332 of the first extension 320.

In a fifth operation, at least a portion of the male fastener 334 is encapsulated within aperture 362 by cold forming a portion of base 312 to substantially surround and confine the head 336 and a portion of the shaft 338 of the male insert 334 therewithin. Also, the second extension 324 is further formed and the aperture 350 is partially formed.

In a sixth operation, the third extension 328 is formed and the aperture 350 is formed to extend through the second extension 324 and the third extension 328 substantially along the second axis 326.

In a seventh operation, the rings 352 are formed circumferentially about the third extension 328.

In other exemplary embodiments, one or more of the operations discussed above in reference to the exemplary method of manufacturing a cold formed battery terminal may be combined into a single operation and/or one or more of the operations may be split into two or more separate operations. Further, additional intermediate steps and/or finishing steps may be included.

FIGS. 35A-41B show a non-limiting variety of exemplary embodiments of inserts that may be used in any cold formed battery terminals and/or cold formed battery terminal manufacturing processes or operations disclosed herein.

FIGS. 35A-35B show an insert 410 that is a female insert and that includes a head 412 and a shaft 414 that is unthreaded according to an exemplary embodiment. The insert 410 is shown further including a recess 416 extending downward from a top surface 418. The recess 416 is configured to be engaged by any of a number of suitable tools. While the recess 416 (e.g., aperture, opening, hole, cavity, etc.) is shown substantially circular and extending a first distance downward or inwardly from the top surface 418 of the insert 410, the recess 416 may have any number of shapes (e.g., hexagonal, square, tapered, etc.) and/or extend to varying distances from the top surface 418 of the insert 410 according to alternative exemplary embodiments. According to some exemplary embodiments, the insert may not include a recess, or the recess may be disposed at a different orientation and/or location.

FIGS. 36A-36B show an insert 510 that is a female insert and that includes a head 512, a shaft 514, and plurality of annular rings 516 disposed circumferentially about the shaft 514 according to an exemplary embodiment. Similar to the exemplary insert 410 shown in FIGS. 35A-35B, the insert 510 further includes a recess 518 extending downward from a top surface 520. The recess 518 is configured to be engaged by any of a number of suitable tools. While the recess 518 (e.g., aperture, opening, hole, cavity, etc.) is shown substantially circular and extending a first distance downward or inwardly from the top surface 520 of the insert 510, the recess 518 may have any number of shapes (e.g., hexagonal, square, tapered etc.) and/or extend to varying distances from the top surface 520 of the insert 510 according to alternative exemplary embodiments. According to some exemplary embodiments, the insert may not include a recess or the recess may be disposed at a different orientation and/or location.

FIGS. 37A-37B show an insert 610 that is a male insert and that includes a head 612 and a shaft 614 including a threaded portion 616 and a smooth portion 618 according to an exemplary embodiment. The head 612 includes a rim 620 and a projection 622 that is shown substantially hexagonal. The rim 620 is disposed proximate to the shaft 614 and the projection 622 is disposed distal to the shaft 614 relative to the rim 620. The projection 622 and/or head 612 may be engaged by any number of suitable tools.

FIGS. 38A-38B show an insert 710 that is a male insert and that includes a head 712 and a shaft 714 including a threaded portion 716 and a smooth portion 718 according to an exemplary embodiment. The head 712 includes a top surface 720 and is shown substantially hexagonal. Unlike the insert 610 shown in FIGS. 37A-37B, the insert 710 does not include a rim. The head 712 may be engaged by any number of suitable tools.

FIGS. 39A-39B show an insert 810 that is a male insert and that includes a first shaft portion 812 that is smooth, a stop 814, a second shaft portion 816, a plurality of annular rings 818 shown extending substantially circumferentially about the second shaft portion 816, and a base 820 according to an exemplary embodiment.

FIGS. 40A-40B show an insert 910 that is a quick disconnect insert according to an exemplary embodiment. The insert 910 includes a base 912 that is shown substantially circular and a projection 914 that is shown substantially hexagonal extending outwardly from a top surface 916 of the base 912. A keyed recess 918 is shown disposed substantially within the projection 914. The keyed recess 918 is configured to be engaged by any of a number of tools suitable for engaging and/or facilitating a quick release of the battery terminal from a battery upon rotation.

FIGS. 41A-41B show an insert 1010 that is a quick disconnect insert according to an exemplary embodiment. The insert 1010 includes a base 1012 that is shown substantially circular. A keyed recess 1014 is shown disposed substantially within the base 1012, extending downwardly or inwardly from a top surface 1016 of the base 1012. The keyed recess 1014 is configured to be engaged by any of a number of tools suitable for engaging and/or facilitating a quick release of the battery terminal from a battery upon rotation.

According to an exemplary embodiment, any of the above-discussed exemplary methods of manufacturing a cold formed battery terminal and variations thereof may include incorporation or encapsulation of an insert shown in FIGS. 26A-32B or variations thereof. Generally, the inserts may or may not be quick disconnect inserts. Further, the shapes and sizes of the shafts, heads, and other insert elements may vary depending on the embodiment.

Referring to FIGS. 42-46, a cold formed battery terminal 1110 including a female insert 1112 is shown according to an exemplary embodiment. According to one exemplary embodiment, the insert 1112 is positioned within a recess 1114 cold formed in a base 1116. The recess 1114 is shown extending downward along a first axis 1118 and into a first extension 1120. The insert 1112 is positioned in the recess from above using a mandrel or other positive locator, moving from proximate a first surface 1122 of the base 1116 toward a second surface 1124 of the base 1116. The insert 1112 is substantially encapsulated within the battery terminal 1110 during a subsequent cold forming operation. The mandrel or positive locator may remain at least partially in the insert 1112 during the encapsulation step.

According to an exemplary embodiment, one or more recesses and/or apertures may be formed to facilitate encapsulating or partially encapsulating an insert (male or female) within a battery terminal. These recesses and/or apertures may be formed to have any number of shapes and sizes. Multiple recesses and/or apertures may be united to form an aperture or other opening, may be formed separately and remain separate, and/or may be formed at varying orientations relative to the surfaces of the base.

According to an exemplary embodiment, recesses and/or apertures formed during cold forming of a battery terminal as disclosed herein may be coaxial with an extensions of the battery terminal, or, alternatively, may be disposed at any number of angles relative thereto. Further, these recesses and/or apertures may be formed entirely within an extension, partially within an extension, entirely within the base, and/or at other locations in/through the battery terminal.

According to an exemplary embodiment, an insert may be encapsulated entirely within an extension, partially within an extension, entirely within the base, or partially within the base.

According to an exemplary embodiment, an insert at least partially encapsulated within a battery may be disposed at a ninety degree angle relative to the longitudinal axis defined by an extension of a battery terminal. According to other exemplary embodiment, an insert at least partially encapsulated within a battery terminal may be disposed at an angle other than ninety degrees (e.g., 45 degrees, 30 degrees, 2 degrees, etc.).

According to an exemplary embodiment, more than one insert may be at least partially encapsulated within the battery terminal. These inserts may be coaxial, not coaxial, offset, etc.

According to an exemplary embodiment, the shapes and/or sizes of the extensions may vary. For example, one or more extensions may be tapered or partially tapered; one or more extensions may have an oval-shaped cross section, a partially curved cross-section, or an uncurved cross-section; one or more extensions may be tiered, having some portions that extend one distance above a surface or the base and other portions that extend another (different) distance above the same surface of the base; etc.

According to an exemplary embodiment, a mandrel or positive positioning device may or may not be used to position the insert and may or may not remain therein during encapsulation of the insert within the battery terminal. Further, the insert may be inserted from the top, bottom, or the side of the battery terminal. In some exemplary embodiments, the insert extends partially above the first surface of the battery terminal, extends partially below the second surface of the battery terminal, or both. In other exemplary embodiments, the insert is entirely encapsulated within the battery terminal (e.g., not extending above or below the first and second surfaces, respectively, of the battery terminal, etc.).

Although the invention has been described in conjunction with specific embodiments thereof, it is evident that alternatives, modifications and variations will be apparent to those skilled in the art. For example, as illustrated in FIGS. 13 and 14, a battery terminal may be formed in which the first extension extends a greater distance from the base, than the extension of FIG. 12. Additionally, the insert may not extend beyond the first extension as illustrated in FIG. 14 or may be done away with altogether. It is intended that the claims embrace these and other alternatives, modifications and variations which fall within the spirit and scope of the appended claims.

As utilized herein, the terms "approximately," "about," "substantially," and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the invention as recited in the appended claims.

It should be noted that the term "exemplary" as used herein to describe various embodiments is intended to indicate that such embodiments are possible examples, representations, and/or illustrations of possible embodiments (and such term is not intended to connote that such embodiments are necessarily extraordinary or superlative examples).

For the purpose of this disclosure, the term "coupled" means the joining of two members directly or indirectly to one another. Such joining may be stationary or moveable in nature. Such joining may be achieved with the two members or the two members and any additional intermediate members being integrally formed as a single unitary body with one another or with the two members or the two members and any additional intermediate members being attached to one another. Such joining may be permanent in nature or may be removable or releasable in nature.

It should be noted that the orientation of various elements may differ according to other exemplary embodiments, and that such variations are intended to be encompassed by the present disclosure.

It is important to note that the construction and arrangement of the cold formed battery terminal as shown in the various exemplary embodiments is illustrative only. Although only a few embodiments have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited in the claims. For example, elements shown as integrally formed may be constructed of multiple parts or elements, the position of elements may be reversed or otherwise varied, and the nature or number of discrete elements or positions may be altered or varied. The order or sequence of any process or method steps may be varied or re-sequenced according to alternative embodiments. Other substitutions, modifications, changes and omissions may also be made in the design, operating conditions and arrangement of the various exemplary embodiments without departing from the scope of the present inventions.

What is claimed is:

1. A method for manufacturing a cold formed battery terminal, comprising:
    providing a slug;
    cold forming the slug into a base having a first surface and an opposing second surface;
    cold forming a first extension, the first extension extending outwardly a distance from the first surface and the first extension substantially defining a first longitudinal axis; and
    cold forming a second extension, the second extension extending outwardly a distance from the second surface and the second extension substantially defining a second longitudinal axis, the second longitudinal axis being offset a distance from the first longitudinal axis.

2. The method of claim 1, further comprising cold forming an aperture through the second extension, the aperture being substantially coaxial with the second longitudinal axis.

3. The method of claim 2, further comprising cold forming at least one acid ring circumferentially about the second extension.

4. The method of claim 3, wherein cold forming the acid ring includes cold forming the acid ring from a first shape to a second shape,
- wherein the first shape includes a first shape inner portion closer to the second longitudinal axis than a first shape outer portion, the first shape inner portion including a first inner width at least as wide as a first outer width of the first shape outer portion, and
- wherein the second shape includes a second shape inner portion closer to the second longitudinal axis than a second shape outer portion, the second shape outer portion including a second outer width greater than a second inner width of the second shape inner portion.

5. The method of claim 2, further comprising cold forming at least one ring disposed about the second extension from a first shape to a second shape using a first cold forming member and a second cold forming member,
- wherein the at least one ring includes a first portion a first distance from the second longitudinal axis and a second portion a second distance from the second longitudinal axis, the second distance being greater than the first distance,
- wherein, in the first shape, the first portion includes a first width being at least as wide as a first width of the second portion, and
- wherein, in the second shape, the second portion includes a second width greater than a second width of the first portion.

6. The method of claim 1, further comprising cold forming the base to at least partially encapsulate an insert within the first extension, the first extension at least partially defining an electrical receiving portion of the battery terminal.

7. The method of claim 6, further comprising cold forming a third extension, the third extension extending outwardly a distance from the first surface and being substantially coaxial with the second extension along the second longitudinal axis.

8. A method for manufacturing a cold formed battery terminal, comprising:
- providing a slug;
- cold forming the slug into a base having a first surface and an opposing second surface;
- cold forming a first extension, the first extension extending outwardly a first distance from the first surface and substantially defining a first longitudinal axis;
- cold forming a first aperture through the first extension; and
- cold forming a second extension, the second extension extending outwardly a second distance from the second surface and substantially defining a second longitudinal axis, the second longitudinal axis being substantially parallel to and offset a distance from the first longitudinal axis.

9. The method of claim 8, wherein cold forming the first aperture through the first extension includes cold forming a first recess and a second recess substantially coaxial with the first longitudinal axis.

10. A method for manufacturing a cold formed battery terminal, comprising:
- providing a slug;
- cold forming the slug into a base having a first surface and an opposing second surface;
- cold forming a first extension, the first extension extending outwardly a first distance from the first surface and substantially defining a first longitudinal axis;
- cold forming a first aperture through the first extension; and
- cold forming a second extension, the second extension extending outwardly a second distance from the second surface and substantially defining a second longitudinal axis, the second longitudinal axis being substantially parallel to and offset a distance from the first longitudinal axis
- wherein cold forming the first aperture through the first extension includes cold forming a first recess and a second recess substantially coaxial with the first longitudinal axis; and
- removing a plug disposed between the first recess and the second recess to form the first aperture to extend through the first extension, the first aperture including a first portion having a first cross section and a second portion having a second cross section, the second cross section being larger than the first cross section.

11. The method of claim 10, further comprising disposing an insert including a head and a shaft into the first aperture, the head being received within the first portion of the first aperture and the shaft being received at least partially within the second portion of the first aperture.

12. The method of claim 10, further comprising encapsulating at least a portion of an insert in the first aperture, the insert extending outwardly from the first surface a distance greater than the first distance that the first extension extends outwardly from the first surface.

13. The method of claim 8, further comprising cold forming a second aperture through the second extension.

14. The method of claim 13, further comprising cold forming at least one acid ring circumferentially about the second extension.

15. A method for manufacturing a cold formed battery terminal, comprising:
- providing a slug;
- cold forming the slug into a base having a first surface and an opposing second surface;
- cold forming a first extension, the first extension extending outwardly a first distance from the first surface and substantially defining a first longitudinal axis;
- cold forming a first aperture through the first extension; and
- cold forming a second extension, the second extension extending outwardly a second distance from the second surface and substantially defining a second longitudinal axis, the second longitudinal axis being substantially parallel to and offset a distance from the first longitudinal axis;
- cold forming a second aperture through the second extension;
- cold forming at least one acid ring circumferentially about the second extension, wherein cold forming the acid ring includes cold forming the acid ring from a first shape to a second shape,
- wherein the first shape includes a first shape inner portion closer to the second longitudinal axis than a first shape outer portion, the first shape inner portion including a first inner width at least as wide as a first outer width of the first shape outer portion, and
- wherein the second shape includes a second shape inner portion closer to the second longitudinal axis than a second shape outer portion, the second shape outer portion including a second outer width greater than a second inner width of the second shape inner portion.

16. A method for manufacturing a cold formed battery terminal, comprising:
- providing a slug;
- cold forming the slug into a base having a first surface and an opposing second surface;
- cold forming a first extension, the first extension extending outwardly a first distance from the first surface and substantially defining a first longitudinal axis;

cold forming a first aperture through the first extension; and
cold forming a second extension, the second extension extending outwardly a second distance from the second surface and substantially defining a second longitudinal axis, the second longitudinal axis being substantially parallel to and offset a distance from the first longitudinal axis;
cold forming a second aperture through the second;
cold forming at least one ring disposed about the second extension from a first shape to a second shape using a first cold forming member and a second cold forming member,
wherein the at least one ring includes a first portion a first distance from the second longitudinal axis and a second portion a second distance from the second longitudinal axis, the second distance being greater than the first distance,
wherein, in the first shape, the first portion includes a first width being at least as wide as a first width of the second portion, and
wherein, in the second shape, the second portion includes a second width greater than a second width of the first portion.

17. A method for manufacturing a cold formed battery terminal, comprising:
providing a slug;
cold forming the slug into a base having a first surface and an opposing bottom surface;
cold forming a first extension, the first extension extending outwardly a first distance from the first surface and substantially defining a first longitudinal axis; and
cold forming a second extension, the second extension extending outwardly a second distance from the first surface and substantially defining a second longitudinal axis, the second distance being greater than the first distance and the second longitudinal axis being substantially parallel to and offset a distance from the first longitudinal axis.

18. A method for manufacturing a cold formed battery terminal, comprising:
providing a slug;
cold forming the slug into a base having a first surface and an opposing bottom surface;
cold forming a first extension, the first extension extending outwardly a first distance from the first surface and substantially defining a first longitudinal axis; and
cold forming a second extension, the second extension extending outwardly a second distance from the first surface and substantially defining a second longitudinal axis, the second distance being greater than the first distance and the second longitudinal axis being substantially parallel to and offset a distance from the first longitudinal axis;
cold forming a third extension, the third extension extending outwardly a third distance from the second surface along the second longitudinal axis.

19. The method of claim 18, further comprising cold forming an aperture extending through the second extension and the third extension to at least partially define a battery coupling portion of the base.

20. The method of claim 19, further comprising cold forming at least one acid ring circumferentially about the third extension.

21. The method of claim 20, wherein cold forming the acid ring includes cold forming the acid ring from a first shape to a second shape,
wherein the first shape includes a first shape inner portion closer to the second longitudinal axis than a first shape outer portion, the first shape inner portion including a first inner width at least as wide as a first outer width of the first shape outer portion, and
wherein the second shape includes a second shape inner portion closer to the second axis than a second shape outer portion, the second shape outer portion including a second outer width greater than a second inner width of the second shape inner portion.

22. The method of claim 18, further comprising cold forming at least one ring disposed about the third extension from a first shape to a second shape using a first cold forming member and a second cold forming member,
wherein the at least one ring includes a first portion a first distance from the second longitudinal axis and a second portion a second distance from the second longitudinal axis, the second distance being greater than the first distance,
wherein, in the first shape, the first portion includes a first width being at least as wide as a first width of the second portion, and
wherein, in the second shape, the second portion includes a second width greater than a second width of the first portion.

23. The method of claim 20, further comprising at least partially encapsulating an insert in the first extension to at least partially form an electrical connection portion of the battery terminal.

* * * * *